United States Patent [19]
Townsend

[11] 3,738,527
[45] June 12, 1973

[54] METHOD OF MANUFACTURING AND LINER FOR LIQUID STORAGE TANK

[76] Inventor: Joseph W. Townsend, 54 Union Street, Pennsville, N.J.

[22] Filed: Nov. 18, 1970

[21] Appl. No.: 90,729

[52] U.S. Cl............. 220/63 R, 161/160, 220/9 M, 220/31 S
[51] Int. Cl............................................. B65d 5/56
[58] Field of Search............. 220/63 A, 63 R, 9 F, 220/9 M, 31 S, DIG. 23; 229/14 R, 14 H; 161/159, 160, 184, 192, 247

[56] References Cited
UNITED STATES PATENTS

| | | | |
|---|---|---|---|
| 3,132,761 | 5/1964 | Sylvester | 220/63 R X |
| 3,150,794 | 9/1964 | Schlumberger et al. | 220/63 R X |
| 3,434,588 | 3/1969 | Kirkpatrick | 220/63 R X |
| 3,474,625 | 10/1969 | Draper et al. | 220/63 R X |
| 3,495,756 | 2/1970 | Achermann et al. | 220/63 R X |
| 3,578,524 | 5/1971 | Ingnell | 220/63 R X |

Primary Examiner—M. Henson Wood, Jr.
Assistant Examiner—Michael Mar
Attorney—Wynne and Finken

[57] ABSTRACT

A vessel is provided having a substrate bonded to the interior thereof and an inner facing layer bonded to the substrate, the substrate providing a distortable mat of a closed-cell material which acts as a resilient spring means to absorb distortion of the flexible impervious inner facing layer thereby inhibiting rupture and facilitating non-destructive movement of the liner.

A chemical reactor or storage tank is provided having on its internal surfaces a closed-cell foamed synthetic resin and on the interior thereof a corrosion-resistant plastic material, the two layers being intimately bonded together and to the exterior shell of the tank or reactor.

1 Claim, 1 Drawing Figure

PATENTED JUN 12 1973
3,738,527
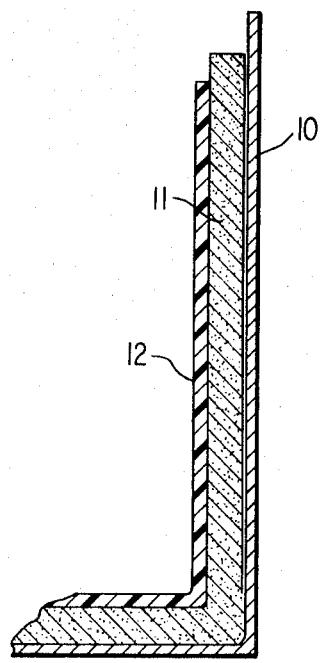
INVENTOR
JOSEPH W. TOWNSEND
BY Wynne & Finken
ATTORNEYS

METHOD OF MANUFACTURING AND LINER FOR LIQUID STORAGE TANK

BACKGROUND OF THE INVENTION

It is known that many chemicals and corrosive materials attack metal and wooden vessels, such as, metal reactors and storage tanks. Many linings have been proposed for such vessels. However, such vessels are frequently subjected to extreme pressure and particularly temperature changes. The problem in the art has been that the coefficient of expansion of the vessel, usually metal, is significantly different from the coefficient of expansion of the lining material, which results in rupture and separation of the liner from the tank structure, permitting corrosive activity thereon.

Particularly difficult has been the repair or replacement of old large wooden vessels, some being 4 feet high, 4 feet wide and 30 or more feet long. The building housing such tanks must be partially destroyed to enable removal of such tanks. The simple application of a coating to such tanks has been tried but the life of such a coating is very short due to ruptures caused by temperature changes.

IN THE SPECIFICATION

The object of this invention is to provide a heat-insulating and chemically resistant (including corrosion-proof) liner for a vessel which will not deteriorate under expansion changes due to temperature changes encountered. A tank is provided consisting of:

1. a relatively thick interior substrate of closed cell plastic foamed distortable synthetic resin intimately bonded to the vessel; and
2. on the interior thereof, an impervious chemically resistant synthetic resin inner facing layer. The resulting structure enables the liner to survive the severe thermal expansion changes which the vessel may undergo.

IN THE DRAWINGS

FIG. 1 is a vertical section through a typical vessel embodying the invention herein.

Referring to the drawings, the exterior shell of the vessel is indicated at 10. Normally, such vessels are constructed of mild steel or the like. The closed-cell plastic foam substrate is indicated at 11 and the inner facing layer is indicated at 12. The thickness of the foam material 11 will vary with the expansion properties of the vessel. As an example, where the thermal expansion results in a ¼ inch diametric change, the foam layer circumferential change will be quite significant. The foam substrate is a closed-cell plastic such as cellular polypropylene, polyethylene, polyamide or polyurethane. Such materials are readily available and may be supplied in sheets which are adhesively bonded to the shell of the vessel. The joints between sheets need not be impervious as the inner facing layer 12 serves this requirement.

The material in contact with the contents of the vessel is a material which is resistant to attack by the contents. It is advantageously reinforced with fiberglass. One material which has been found to be resistant to most chemical reactants is an epoxy resin, customarily based on an epichlorhydrin-glycol condensate. For acids, such as HCl, polyester resins such as those base on polyethylene terephthalate are preferred as the corrosion-resistant liner. For alkaline compositions, the interior liner may be a polyester, a furane resin or a phenolic resin material reinforced with fiberglass.

The closed-cell foam substrate 11 is adhesively secured to the interior of the vessel by an adhesive, suitably an epoxy resin. It is preferred to oxidize the surface of the foam substrate, as by flame treatment, before applying the inner facing layer 12.

The cellular foam material which forms the substrate of the vessel permits expansion and contraction of the exterior vessel without rupturing the inner facing layer 12. It has been found that the difference between the expansion coefficient of the vessel, usually metal, and the liner may be as high as 6 to 1. The intermediate substrate compensates for this differential and prevents destruction of the liner.

The invention is applicable to existing vessels and reactors or may be employed during the manufacture thereof.

The material used in the inner facing layer not only is impervious, but is easily thickened in weak vessel areas to extend the life of the vessel. Old wooden vessels have uneven surfaces and weakened areas. This invention enables the easy conformance to dimensional variations and reinforcement of weakened areas.

I claim:

1. A vessel for corrosive materials comprising
an exterior tank of structural design and materials to be self-supporting;
an intermediate substrate of closed-cell foamed synthetic cellular resin in the form of sheets bonded in face-to-face engagement with the inside face of said tank to prevent passage of corrosive material to said tank;
an inner facing layer of a chemically-resistant synthetic epoxy fiber glass reinforced resin bonded in face-to-face engagement with said substrate;
said substrate being distortable and said inner facing layer having a higher coefficient of expansion than said tank whereby upon expansion and contraction of the tank and the inner facing layer, the substrate distorts into a compressed condition and expanded condition respectively thereby preventing buckling of the inner facing layer and possible rupture thereof, said substrate having a thickness significantly larger than the thickness of the inner facing layer;
said tank providing the support and structural stability for said substrate and inner facing layer.

* * * * *